(12) United States Patent
Rosenberg

(10) Patent No.: US 6,538,562 B1
(45) Date of Patent: Mar. 25, 2003

(54) PULSE NUMBER IDENTIFICATION

(76) Inventor: Burton A. Rosenberg, 1053 Marina Heights Rd., Brookings, OR (US) 97415

( * ) Notice: Subject to any disclaimer, the term of this patent is extended or adjusted under 35 U.S.C. 154(b) by 367 days.

(21) Appl. No.: 09/178,070

(22) Filed: Oct. 23, 1998

(51) Int. Cl.$^7$ ................................................ H04Q 1/00
(52) U.S. Cl. ................................................ 340/10.1
(58) Field of Search ...................... 340/825.54, 825.34, 340/827.72, 551, 572.1, 572.4, 572.5, 572, 573, 573.4, 505, 101; 342/44; 367/2, 6; 1/1

(56) References Cited

U.S. PATENT DOCUMENTS

| 3,678,250 A | * | 7/1972 | Dethloff et al. ..... 340/825.34 X |
| 3,832,530 A | * | 8/1974 | Reitboeck et al. ...... 340/551 X |
| 4,752,776 A | * | 6/1988 | Katzenstein ........... 340/825.54 |
| 5,083,113 A | * | 1/1992 | Slawinski et al. ....... 340/572.4 |
| 5,467,082 A | * | 11/1995 | Sanderson ............. 340/825.54 |

\* cited by examiner

*Primary Examiner*—Brian A Zimmerman

(57) ABSTRACT

Pulse Number Identification identifies things by counting electric pulses and sending a signal to a counterpart, (16), with a known identity at the specific pulse count it will accept a signal from its counterpart, (26), thereby establishing their similar identities.

22 Claims, 2 Drawing Sheets

PULSE NUMBER IDENTIFICATION

CROSS-REFERENCE TO RELATED APPLICATIONS

NOT APPLICABLE

STATEMENT REGARDING FEDERALLY SPONSORED RESEARCH OR DEVELOPMENT

NOT APPLICABLE

REFERENCE TO A MICROFICHE APPENDIX

NOT APPLICABLE

BACKGROUND OF THE INVENTION

This invention relates to identification of: material and abstract things, that exist or have existed, either momentarily or continuously.
(ID-identification)

Almost all things are or can be identified now. The Dewey decimal classification, the Uniform Price Code, trademarks, model and serial numbers, personal ID numbers, are existing ID systems for material things. Computer software has systems for identifying abstract things. All of these ID systems are prior art. A universal means that can be used to identify the great majority of the incalculable number of things we are involved with is not available and will be very valuable.

BRIEF SUMMARY OF THE INVENTION

The summary and advantages of this invention are as follows:

1. Provides a simple and manageable means of electronically identifying things that is fast. MANAGEABLE is the essence of this invention. Most of the effects described herein are being done now by other means. Many of the means being used are not simple, most are slow, and they have not been encompassed in one system.
2. The electronic means of ID will require little or no human effort and can be accomplished without physical or visual contact.
3. The ID's can be stored in a data bank which is accessible for verifications, additions, deletions, transfers, and data. Some of the advantages of this invention are as follows:
4. Simplifying the means of identification of things makes the ID and the location of them easier.
5. Less human effort and error when ID is done with electrical sensing. Monitoring events scheduled in predetermined programs will allow entire operations to proceed without intervention or a pause until completion or interruption occurs.
6. ID without visual or physical contact is faster, cheaper, less invasive, more accurate, and undetectable.
7. ID's, of a thing, that are stored in a remote data bank can be used to:
   Deter theft by ensuring fraudulent representation of an ID is impossible.
   Verify ownership, transfer ownership, and insert owner ID's in new and old possessions.
   Provide law enforcement with the ID's of things stolen and lost.
   Verify a person's ID so they can get access to equipment and to restricted facilities.
   Inform owners of a lost item that has been sensed by a scanner.
   Identify and locate abducted people when they are sensed by a scanner.
   Locate and identify bodies when searchers carrying scanners come within range of their emitters.
8. Ensure private communication on electronic communications.
9. Prevent the theft and copying of intellectual property.
   Some advantages listed will be explained in the description.

DRAWING REFERENCE NUMERALS

Figure 1:
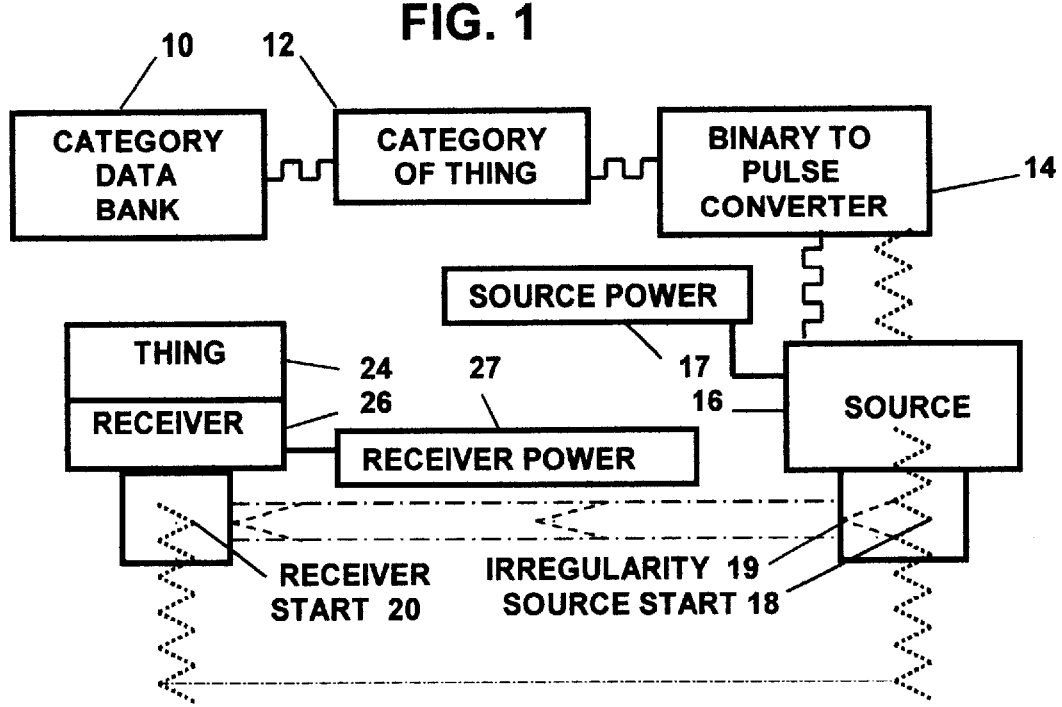
FIG. 1 is a functional block diagram plus the operational process of the entire Identification system.
Figure 1:
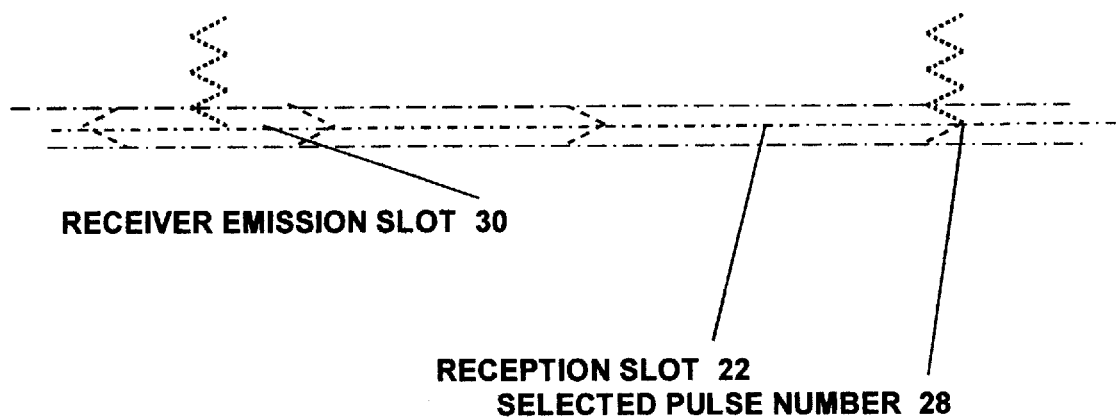

10. Category Data Bank
12. Category of Thing
14. Binary to Pulse Converter
16. Source
18. Source Start
19. Irregularity
20. Receiver Start
22. Reception Slot
24. Thing
26. Receiver
28. Selected Pulse Number
30. Receiver Emission Slot
40. Oscillator
42. Binary Counter
44. Count 0 Detect
46. Logic to Identify Responding Reciever and Internet Response
48. Information to be Sent to Reciever
50. Transmitter
52. To Antenna
54. RF Receiver/Detector
56. Reset Count Detect FIG. 1 illustrates the basic components of this identification system.

A typical category data bank 10 could supply one of the following:

A libraries inventory—authors, subjects, titles.

The uniform price code.

Automobiles—make, model, year, vehicle ID number, etc.

Medical—drugs, supplies, diagnoses manuals, patient histories, etc.

The number of categories and subcategories is incalcuable since the various cultures: manufacturing, education, military, etc. and the activities they engage in are innumerable. The category of a Thing 12 is a culture's name and use for all similar Things 24.

Binary to pulse converter 14 supplies the code pulse number of the Thing 24 in its category by converting its binary code to its pulse code. Source 16 is the electronic device that contains the pulse code number of the Thing 24 plus other functions. Source start 18 inputs an irregularity in the pulse to indicate the start of the pulse count to the Receiver. Receiver start 20 starts its pulse count from the irregularity in the Source's pulse. Reception slot 22 is the place in the Source's emitted pulse when the Source is open to receive a message. Thing 24 is an entity that has objective or conceptual reality. Receiver 26 is attached to a Thing and its circuity reponds with the Thing's pulse number at the Receiver emission slot 30. The selected pulse number 28 is the number of pulses in the category of the Thing 12 that identify it. The Receiver emission slot 30 is at the selected pulse number 28.

Figure 2:
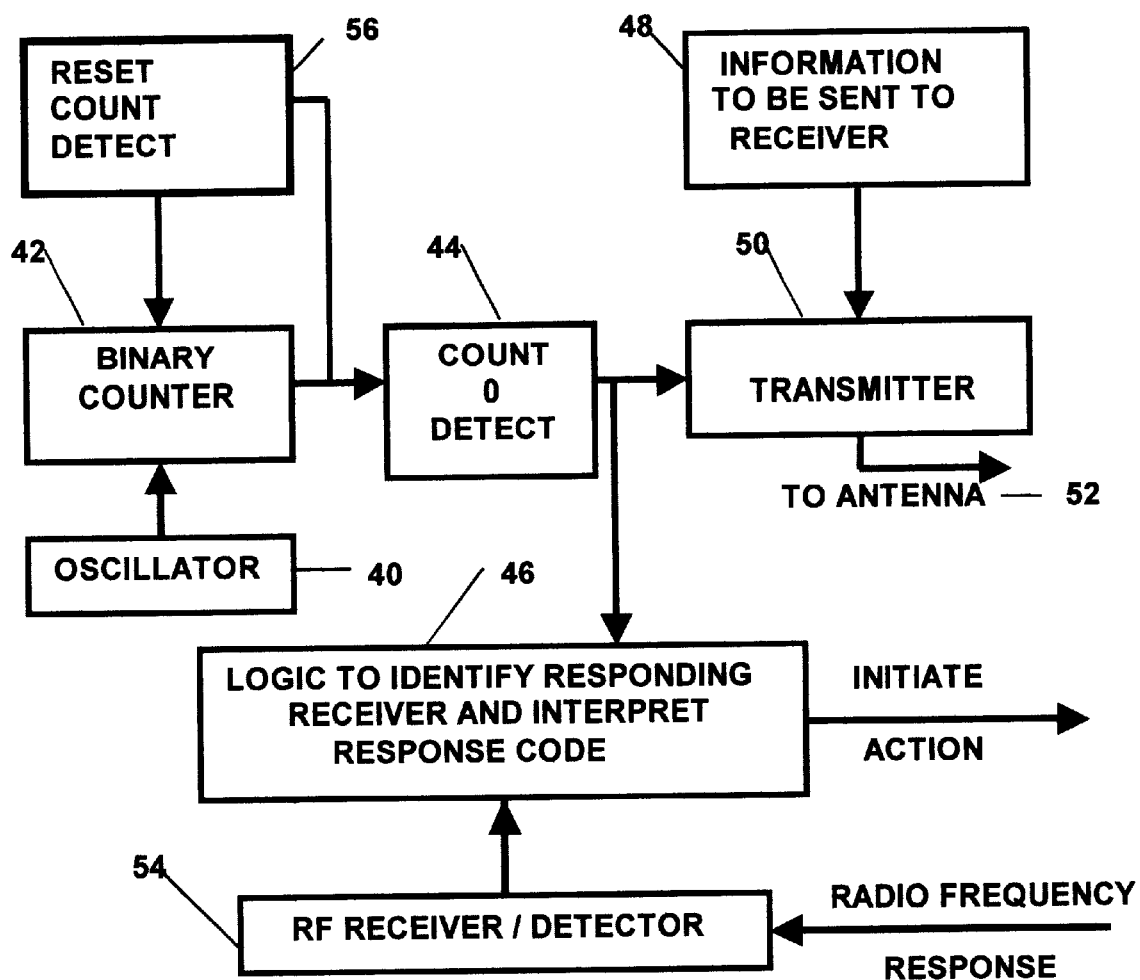
FIG. 2 is a block diagram illustrating the interaction between the two counterparts that validate Identification.

FIG. 2: The oscillator 40 supplies the binary counter with a pulsing emission. The binary counter 42 supplies the count 0 detect, logic to identify, information sent, transmitter, antenna, and RF Receiver/detector. 40,42,44,48,50,52 are parts of the Source 16. Count 0 detect 44 starts the pulse count of the Source 16 and the Receiver 26. The logic to identify 46 operates at the reception slot 22. The information sent 48 is from the Receiver. The transmitter 50 and its antenna 52 communicates with the Receiver. The RF Receiver/Detector 54 interacts with 52,44,46,48, and 50. Reset 56 acts when the Source 16 directs it to.

DETAILED DESCRIPTION OF THE INVENTION

My invention is based on pulse counting. Pulse or frequency counters are available commercially. The technology is well known. Frequencies of one million cycles per second are common. There is no reason to limit the number of cycles available to those occurring in one second. At one of the cycles, or pulses, Source start 18, emits an irregularity in a circuit designed to interact with another circuit at a chosen pulse count, selected pulse count 28, and no other. The initiating circuit would input said irregularity, such as a radio frequency pulse, in the pulses at regular intervals and start counting from it. The circuit would be receptive, reception slot 22, to an external input at the selected pulse count 28 following the irregularity and no other. This circuit is called the SOURCE 16. An external circuit, in the counterpart of the SOURCE 16, called the RECEIVER 26, receives the pulsating emission from the SOURCE 16 and is induced to pulse synchronously. The RECEIVER 26 has been set to emit a signal, Receiver emission slot 30, when the SOURCE 16 is at the one pulse count, reception slot 22, when it is receptive to an external signal. The RECEIVER 26 starts its count at the irregularity in the SOURCE's 16 pulsation so the number of its pulses after the irregularity is identical to the SOURCE's 16. The matched pulse count identifies the RECEIVER 26 as the counterpart of the SOURCE 16. This ID system is called the Pulse Number ID or PNID for short.

The SOURCE 16, upon-getting a signal, at the selected pulse number 28, from the RECEIVER 26, can:(among other things)
1. Indicate that has happened.
2. Send a "start" or "stop" signal to the RECEIVER whereupon it starts or stops the thing the RECEIVER is part of.
3. Send a signal to a law enforcement agency and tell them the location where the RECEIVER, which was stolen or lost, has been sensed.
4. Record that a Thing has been sold.
5. Send a signal to begin the next operation on the Thing the RECEIVER is attached to in a manufacturing plant.
6. Count the number of identical RECEIVERS present with the assistance of ancillary equipment.
7. Determine the physical location of a RECEIVER in a facility and record that location in data storage.
8. Turn on or off the unit the SOURCE is part of.
9. Interact with RECEIVER's in the same category by altering its pulse count until it has indexed all of them that are present into data storage.

The SOURCE and RECEIVER's pulsations are locked together so steady state pulsations are not required. An oscillating circuit is adequate if the pulsations are locked together.

The foregoing description describes a means of identification that is kindergarten simple. The essence of this invention is that it is manageable. A nearby or a remote data bank containing the identifying pulse number is practical due to its simplicity. The current system of checking on credit cards is an example of such a remote site. Most operations utilizing the PNID will have the ID's and related data stored near the SOURCE since secrecy is not required. A manufacturing plant is an example. It can use any PNID category system it prefers and not affect the final ID which can be inserted when the product is sold.

Operation of Some Systems Utilizing the Preceding Capabilities

1. Keeping Track of Things is One of Our Major Problems.

A classification system will be created to simplify and expand the use of the PNID. Antiaircraft shells and asparagus will be in different categories. A simple binary code will identify the category desired. Subcategories will be identified similarly. More categories will result in a smaller number of Things in each categories for the PNID to traverse which will improve the efficiency since the PNID is slower than binary. One of the current cataloguing systems that employ the binary code can be used.

Manufacturing plants must control innumerable operations and Things. A fast identification system that does not require visual or physical contact and that produces an identifying electronic signal will fit into production control perfectly. All operations will be scheduled and monitored automatically and there will be an ongoing inventory of all of the items required for completion. No attention would be required until the sequence of planned events is behind schedule, interrupted, or there is a shortage of items required for completion. All material control and material handling will be based on signals emitted during the progress of the Thing being manufactured. Antennas would be installed where needed.

Inventory status and control by a fast ID system that does not require visual or physical contact will be very useful for the following:

| Government Facilities | Libraries | Hospitals | Museums |
|---|---|---|---|
| Warehouses | Schools | Construction | Etc. |
| Retail/Wholesale | Records | Shipping | |
| 2. Theft. | Location. | | Identification. |

The owner's key would be required to start a PNID equipped automobile. A SOURCE or a RECEIVER would in the owner's key. Theft with the key such as occurs during hijacking would be unprofitable. Profiting from automobile theft requires selling the whole vehicle or dismantling it and selling the parts. Vehicle identifications stored at a remote data bank can be used to locate a stolen vehicle when the thief attempts to sell it or buy parts for it. PNID with switches will be located in subassemblies such as the engine, transmission, etc. which will be inoperable without the vehicle's PNID input so the subassemblies cannot be used in other vehicles. It would be uneconomical to dismantle the subassemblies and remove the PNID's because that will require breaking the parts they are buried in and new parts will be unobtainable. Structural body parts would have PNID microchips under their paint which would identify them as stolen as would the whole vehicle when law officials scanned it or it stopped at a stop sign equipped with scanners. A silent detection would not alert the thieves that their location was known. The location of the scanner detecting it would be known. Repeated detection at that scanner would further assist in apprehending the thief. This capability greatly exceeds what the police have now.

The PNID will deter theft of electrical devices that operate off of a specific electrical circuit. The circuit would have a SOURCE in it. The devices would have RECEIVERS in them with the same pulse number as the SOURCE. The "start" signal from the SOURCE would have to given to activate the RECEIVER's start circuit. The owners pulse count will be inserted into the device's RECEIVER when it is purchased or when it is altered to add the PNID system to it. SOURCE's could be used instead of RECEIVER's in the devices. There would be a RECEIVER in the electric supply circuit when the SOURCE's are in the devices.

Houses, apartments, offices, and any other activities located in structures with electrical circuits would utilize this theft deterrent. Retail outlets will not activate the RECEIVER or SOURCE until they are sold so the things will not operate until then. Theft during shipping will be unprofitable since the devices are inoperable without a PNID.

Large retail outlets will remove the checkout stands and replace them with antenna turnstiles. Customers will put most of their purchases in bags as they select them. The bill at the turnstile would include all they have selected including what they have in their pockets, purses, bra's, etc. Employee theft would be eliminated.

The PNID will deter theft of Things that do not contain electrical circuits by inserting a microchips RECEIVER in them. A device similar to the scanner on the end of a cord used at checkout stands to read the Uniform Price Code will facilitate reading PNID's on Things that do not have electricity or a battery can be connected momentarily to them. The distance between the SOURCE and RECEIVER will determine the amount of energy required. SOURCE's located in corridors leading to exits would alert guards or take photographs of the thief when the RECEIVER was within range. Retail outlets currently use theft detection scanners at exits that detect antitheft devices inserted in products that were not inactivated at the checkout stand. The PNID would detect and identify the item that hasn't been paid for. Bicycles, etc. will have RECEIVER's in them and they will be scanned in places where bicycles go. Legal documents such as deeds, negotiable bonds, etc. will have RECEIVER's inserted in them to eliminate forgery, assist in finding them, and prevent unauthorized sale of them. Antiques, art objects, etc. will have RECEIVER's in them. Office workers will be able to find files that were misfiled.

Parents will have RECEIVER's implanted in their children by colorless tattoos or other means that are currently used for implants to find them if they are abducted, under a fallen structure, or lost. RECEIVERS could also be attached to clothing, etc. when desired. RECEIVER's can be used to find a body and identify bodies, both of which which will be very helpful for the military. Luggage destined for Europe won't be sent to Alaska or be on a plane unless the owner of it is on the plane. Farmers and pet owners will have them inplanted in their animals.

Receiver's will be used to provide access to: restricted areas, files in computers, restricted communication systems, etc.

RECEIVER's and SOURCE's will interact continuously during communications to activate circuits that delete the noise put into the signals to prevent eavesdroppers from listening in. Computer software and VCR tapes are both commonly copied, sold, and passed around with total disregard of intellectual property rights. The prices of all of them are increased to make up for the theft of them. A PNID coded noise imprinted in them plus a PNID device that removes the noise would allow their manufacturers to sell them to owners of the PNID equipment at a reduced price. The retail outlet would imprint them with the noise and the purchaser's personal PNID code that would activate the purchaser's device that removed the noise.

While my description contains many specifities, these should not be construed as limitations on the scope of the invention, but rather as an exemplification of the embodiments thereof. Many other variations are possible. For example, the PNID can identify the category and the binary code used to find the Thing in the category. Accordingly, the scope of the invention should be determined not by the embodiments illustrated, but by the appended claims and their legal equivalents.

I claim:

1. An Identification system comprising:

Counterparts with electrical circuits in them;

some of said Counterparts are attached to things;

a Counterpart, which has a known identity, is within range of electromagnetic emissions from some of the Counterparts attached to said things and it emits an electromagnetic code which identifies the category the Counterpart belongs in, and some of said other Counterparts start to pulsate in unison because the emitted code matches their category code thereby activating their inductive pulse circuits; and following the category match the Counterpart with the known identity emits a momentary irregularity in its pulsing emission; after a varied number of pulses the said other Counterparts emit irregularities in their inductively pulsing circuits; said Counterpart of known identity is designed to receive emissions at one particular pulse number following its emitted irregularity and no other; and if said other Counterpart's emitted irregularity occurs at that one pulse number identity is established by the reception of emissions to said Counterpart of known identity after which the Counterparts have means to indicate emissions have been sent and received, whereby Identification has been validated.

2. The Identification system of claim 1, wherein matching pulse numbers result in electronic means for emitting a signal wherein scanners at known locations record its presence.

3. The Identification system of claim 1, wherein matching pulse numbers result in electronic means for starting and stopping devices, whereby control of the devices is provided by control of a Counterpart.

4. The Identification system of claim 1, wherein a Counterpart is concealed and reception of its emission will be received undetected by others, thereby preventing others from knowing it has occurred.

5. The Identification system of claim 1, wherein matching pulse numbers further include electronic means for sequential resetting of the pulse count in a Counterpart wherein it is able to successively interact with all Counterparts in the same category that are present and record their presence in a data bank.

6. The Identification system of claim 1, wherein matching pulse numbers further include multiplexing of pulsing along with telecommunications and other electro magnetic wave communications between participants with matched Counterparts, said matched Counterparts have circuits to remove the noise inserted thereby providing secure private communication channels for those with the matched Counterparts.

7. The Identification system of claim 1, wherein matching pulse numbers validate that an Identification that has been granted access to computer terminals, files, and directories therein, thereby preventing Hackers without the validation from invading the system.

8. The Identification system of claim 1, wherein matching pulse numbers result in an audit of all transactions made with a specific Counterpart, whereby employees can be monitored.

9. The Identification system of claim 1, wherein the sequentially matching of pulse numbers is used to inventory and locate all of the people in a prison whereby inmates and guards will know their presence during an incident is in a data bank.

10. The Identification system of claim 1, wherein matching pulse numbers verify the right of access to an Automatic Teller Machine and other devices that currently require the insertion of magnetic code cards and personal identification numbers whereby theft of the card, pin, issuing institution, and devices that will accept it do not exist.

11. The Identification system of claim 1, wherein matching pulse numbers provide access to telecommunications that currently require personal identification numbers whereby verification from a remote data bank can also exclude long distance carriers that overcharge.

12. The Identification system of claim 1, wherein matching pulse numbers enable an owner to set an internal time clock in a device to limit the time it will function without reactivation by its matching Counterpart.

13. The Identification system of claim 1, wherein a Counterpart is inserted in an existing circuit in an existing device and its external Counterpart interacts with it thereby adding all of the advantages described herein to things already owned.

14. The Identification system of claim 13, wherein the Counterpart inserted in said existing circuit is immersed in a self hardening mass of material which can not be removed without damaging the device to the point where it is uneconomical to fix it.

15. The Identification system of claim 1 wherein deceptive pulses are emitted along with the emitted pulses from one of the Counterparts to defeat attempts to record and imitate the signals with an illegal device, said deceptive pulses would not be counted by the legal Counterparts therefor the reception and emission slots in their pulsing would align to establish the Identification.

16. The Identification system of claim 1 wherein a fluctuating pulse is emitted and received by a synchronized Counterpart to make it more difficult to imitate the pulsing with an unauthorized devices.

17. An Identification system comprising:

Counterpart's with electrical circuits in them;

some of said Counterparts are attached to things;

a Counterpart, which has a known identity, is within range of electromagnetic emissions from some of the Counterparts attached to said things, and it emits an electromagnetic code which identifies the category the Counterpart belongs in, and some of said other Counterparts start to pulsate in unison because the emitted code matches their category code thereby activating their inductive pulse circuits; and following the category match the Counterpart with the known identity emits a momentary irregularity in its pulsing emmission; after a varied number of pulses the said other Counterparts emit irregularities in their inductively pulsing circuits; said Counterpart of known identity is designed to receive emissions at one particular pulse number following its emitted irregularity and no other; and if said other Counterpart's emitted irregularity occurs at that one pulse number identity is established by the reception of emissions to said Counterpart of known identity after which the Counterpart have means to indicate emissions have been sent and received, and the number of pulses that identify the Counterpart attached to a thing is stored in a data bank, along with the things description, that is remote from said Counterpart, whereby; ownership verification, insertion of Identification in new and old things and transfer of ownership will be available.

18. The Identification system of claim 17, wherein matching pulse numbers are used to locate stolen and lost things by detection with scanners whose location is known and are connected to said data bank.

19. The Identification system of claim 17, wherein matching pulse numbers are used for verification by said data bank of an Identification qualified to request entry to restricted facilities and use of equipment and data therein.

20. The Identification system of claim 17, wherein matching pulse numbers and said remote data bank are used to find people who are abducted, lost, or dead.

21. The Identification system of claim 17, wherein matching pulse numbers result in the transferrence of data from said remote data bank to law enforcement agencies with the information they need to carry out their legal responsibilities.

22. The Identification system of claim 17, wherein matching pulse numbers result in the access to equipment that requires the matched Counterparts to actuate noise canceling circuits that remove the noise put in recorded and copyrighted intellectual property to prevent: its unlicensed copying, unlicensed sale, and being loaned to others, wherein said matched Counterparts will be inserted from said remote data bank when said equipment and said intellectual property are purchased.

* * * * *